United States Patent
Hablot et al.

(10) Patent No.: US 12,115,764 B2
(45) Date of Patent: Oct. 15, 2024

(54) PLASTOMER TOUGHENED/STIFFENED POLYOLEFIN MULTILAYER FILMS AND LAMINATES COMPRISING SAME

(71) Applicant: Dow Global Technologies LLC, Midland, MI (US)

(72) Inventors: Elodie Hablot, Horgen (CH); Salma El Marrasse Zarioui, Tarragona (ES); Peter Hermann Roland Sandkuehler, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 42 days.

(21) Appl. No.: 17/762,414

(22) PCT Filed: Sep. 29, 2020

(86) PCT No.: PCT/US2020/053222
§ 371 (c)(1),
(2) Date: Mar. 22, 2022

(87) PCT Pub. No.: WO2021/067240
PCT Pub. Date: Apr. 8, 2021

(65) Prior Publication Data
US 2023/0147444 A1    May 11, 2023

(30) Foreign Application Priority Data
Sep. 30, 2019    (EP) .................................... 19382838

(51) Int. Cl.
*B32B 27/32*    (2006.01)
*B32B 7/027*    (2019.01)
(Continued)

(52) U.S. Cl.
CPC .............. *B32B 27/32* (2013.01); *B32B 7/027* (2019.01); *B32B 7/12* (2013.01); *B32B 27/08* (2013.01);
(Continued)

(58) Field of Classification Search
None
See application file for complete search history.

(56) References Cited

U.S. PATENT DOCUMENTS 4,774,277 A     9/1988  Janac et al.
4,784,885 A *  11/1988  Carespodi .......... B65D 77/2032
                                                      428/476.1
(Continued)

FOREIGN PATENT DOCUMENTS

CA    2414050 A1    12/2001
CA    2414056 A1    12/2001
(Continued)

OTHER PUBLICATIONS

ExxonMobil. The product datasheet for ExxonMobil HDPE HTA 108 High Density Polyethylene, Mar. 1, 2014 (Year: 2014).*
(Continued)

*Primary Examiner* — Michael C Romanowski
(74) *Attorney, Agent, or Firm* — Jacob R. Graham

(57) ABSTRACT

The present disclosure provides for a multilayer film having a sealant layer and a first layer, where the first layer is formed from a first polyolefin composition, and a laminate that includes the multilayer film. The first polyolefin composition of the first layer consists essentially of a high density polyethylene (HDPE) resin and a propylene-ethylene copolymer thermoplastic elastomer (TPE). In addition to the first layer of the first polyolefin composition and the sealant layer, the laminate also includes a substrate film and an adhesive layer comprising polyurethane in adhering (Continued)

contact with the substrate film and the first layer, where when the adhesive layer is formed from a solvent-free adhesive the adhesive layer has an elastic modulus of greater than 25 MPa, and when the adhesive layer is formed from a solvent-based adhesive the adhesive layer has an elastic modulus of greater than 0.30 MPa, the elastic modulus being measured for the polyurethane in accordance with ASTM D412.

20 Claims, 4 Drawing Sheets

(51) Int. Cl.
    *B32B 7/12*       (2006.01)
    *B32B 27/08*     (2006.01)
    *B32B 27/36*     (2006.01)
    *B65D 75/00*     (2006.01)
    *C08L 23/06*     (2006.01)

(52) U.S. Cl.
    CPC ............ *B32B 27/36* (2013.01); *B65D 75/008* (2013.01); *C08L 23/06* (2013.01); *B32B 2250/24* (2013.01); *B32B 2270/00* (2013.01); *B32B 2274/00* (2013.01); *B32B 2307/516* (2013.01); *B32B 2307/518* (2013.01); *B32B 2307/546* (2013.01); *B32B 2307/558* (2013.01); *B32B 2307/72* (2013.01); *B32B 2307/732* (2013.01); *B32B 2439/46* (2013.01); *C08L 2205/02* (2013.01)

(56) References Cited

U.S. PATENT DOCUMENTS

| | | | |
|---|---|---|---|
| 6,960,635 B2 * | 11/2005 | Stevens | C09K 3/10 |
| | | | 526/348 |
| 8,053,048 B2 | 11/2011 | Ling et al. | |
| 9,421,743 B2 | 8/2016 | Rosa et al. | |
| 2007/0155905 A1 | 7/2007 | Drewniak et al. | |
| 2008/0106005 A1 | 5/2008 | Fiscus et al. | |
| 2016/0279910 A1* | 9/2016 | Kohlweyer | B32B 27/32 |
| 2018/0099492 A1 | 4/2018 | Yun et al. | |
| 2020/0047460 A1* | 2/2020 | Nguyen | B32B 7/12 |
| 2021/0237408 A1* | 8/2021 | Olszynski | B32B 27/32 |

FOREIGN PATENT DOCUMENTS

| | | |
|---|---|---|
| CN | 103980590 A | 8/2014 |
| CN | 108752691 A | 11/2018 |
| EP | 0092318 A1 | 10/1983 |
| EP | 2675844 A4 | 12/2015 |
| JP | S5259438 A | 5/1977 |
| WO | 2012/112259 A2 | 8/2012 |

OTHER PUBLICATIONS

The Dow Chemical Co., Affinity PL 1880G product information sheet published by The Dow Chemical Company Jan. 2005 (Year: 2005).*
International Preliminary Report on Patentability for related PCT Application PCT/US2020/053222, mailed Apr. 14, 2022 (7 pgs).
International Search Report & Written Opinion for related PCT Application PCT/US2020/053222, mailed Jan. 19, 2021 (11 pgs).
Wolf, et al., "A Technology Decision: Adhesive Lamination or Extrusion Coating/Lamination"; 2010 Place Conference—A Place to Soar, Apr. 18-21, 2010 (26 pgs).
Wu, et al., "Phase structure and adhesion in polymer blends: A criterion for rubber toughening"; Polymer, 1985, vol. 26, November (9 pgs).
Bartczak, et al., "Toughness mechanism in semi-crystalline polymer blends: I. High-density polyethylene toughened with rubbers"; Polymer, vol. 40, 1999 (16 pgs).

* cited by examiner

PLASTOMER TOUGHENED/STIFFENED POLYOLEFIN MULTILAYER FILMS AND LAMINATES COMPRISING SAME

TECHNICAL FIELD

The present disclosure relates generally to polyolefin multilayer films and more particularly to plastomer toughened/stiffened polyolefin multilayer films and to laminates comprising such multilayer films.

BACKGROUND

Typical high toughness polyolefin films used in multilayer films or laminates for stand-up pouches (SUPs) are made of linear low density polyethylene (LLDPE), metallocene catalyzed LLDPE (m-LLDPE) and high density polyethylene (HDPE) blends, where the films can have a thickness between 50 to 150 μm, with the individual coextruded layers being fractions of the total thickness. The combination of such systems target a final multilayer film/laminate structure with a combined high stiffness and high toughness.

Further improvements and downgauging of polyolefin films used in multilayer films and/or laminates requires that these films fulfill conflicting objectives: the films need to be stiffer as they are thinner in order to compensate the loss of bending stiffness through thickness reduction. However, previous approaches to improve stiffness also reduced the toughness and fast deformation resistance of the films. This toughness is the second conflicting property that thinner films still need to have. Toughness in a film (as seen in dart, puncture and tear testing) is improved by choosing lower density polyethylene resins like ultra linear low density polyethylene (ULLDPE) or m-LLDPE, which reduce typically the stiffness of films. Hence there is a need for improvements towards the balance of stiffness and toughness in coextruded polyolefin films intended for multilayer films and/or laminate structures.

SUMMARY

The present disclosure provides for a multilayer film having a first layer and a sealant layer, and a laminate that includes the multilayer film. The multilayer film of the present disclosure helps to achieve a high stiffness and high toughness in the laminate due in part to the first layer formed from a first polyolefin composition. The balance of stiffness and toughness provided by the first layer is also surprisingly improved relative to the use of other elastomers, as discussed herein. One primary application of the laminate having the multilayer film is in stand-up pouches, where improvements in the balance of stiffness and toughness are needed. The laminate having the multilayer film may also be useful for other types of applications such as heavy-duty shipping sacks.

For the various embodiments, the multilayer film of the present disclosure includes a first layer formed from a first polyolefin composition and a sealant layer on the first layer. The first polyolefin composition of the present disclosure consists essentially of a high density polyethylene (HDPE) resin and a propylene-ethylene copolymer thermoplastic elastomer (TPE). Specifically, the first layer is formed from a first polyolefin composition consisting essentially of (a) 80 to 99.9 weight percent (wt. %) of the HDPE resin having a density from 0.935 to 0.966 g/cm³ measured according to ASTM D792 and a melt index ($I_2$) of 0.3 to 8 g/10 minutes measured at 190° C./2.16 kg according to ASTM D-1238, the wt. % based on the total weight of the first polyolefin composition, and (b) 0.1 to 20 wt. % of the propylene-ethylene copolymer TPE comprising at least 60 wt. % of units derived from propylene and at least 0.1 wt. % of units derived from ethylene and having a density of 0.850 to 0.900 g/cm³ measured according to ASTM D792 and a melt index, $I_2$, of 0.1 to 15 g/10 minutes measured at 230° C./2.16 kg according to ASTM D-1238, the wt. % based on the total weight of the first polyolefin composition. In an additional embodiment, the first polyolefin composition can have between 90 and 98 wt. % of the HDPE resin and from 2 to 10 wt. % of the propylene-ethylene copolymer TPE. For the various embodiments, the first layer has a thickness of 30 to 150 micrometers (μm). For the various embodiments, the propylene-ethylene copolymer TPE has a melt temperature of 50 to 130° C. taken at a Differential Scanning calorimeter (DSC) Tm peak. In addition, the propylene-ethylene copolymer TPE has a flexural modulus of 20 to 60 mega-Pascals (MPa) measured according to ASTM D790.

For the various embodiments, the sealant layer can comprise from 50 to 100 percent by weight of the sealant layer of a polyethylene having a density from 0.880 to 0.915 g/cm³ and a melt index, $I_2$, of 0.5 to 5 g/10 minutes measured at 190° C./2.16 kg according to ASTM D-1238, and a peak melting point in a range of from 85° C. to 105° C., and a molecular weight distribution, Mw/Mn range of 2.0 to 3.0.

The laminate of the present disclosure includes (i) a substrate film, (ii) the multilayer film as provided herein and (iii) an adhesive layer comprising polyurethane, where the adhesive layer is in adhering contact with the substrate film and the first layer of the multilayer film (the first polyolefin composition) as provided herein. For the various embodiments, the substrate film comprises a biaxially oriented polyethylene terephthalate film, a biaxially oriented polypropylene film or an oriented polyethylene film. For the various embodiments, the first layer is as provided above and herein. For the various embodiments, the sealant layer in contact with the first layer can be formed from the polyethylene as provided herein. For the various embodiments, the adhesive layer comprising polyurethane in adhering contact with the substrate film and the first layer, where when the adhesive layer is formed from a solvent-free adhesive the adhesive layer has an elastic modulus of greater than 25 MPa, and when the adhesive layer is formed from a solvent-based adhesive the adhesive layer has an elastic modulus of greater than 0.30 MPa, the elastic modulus being measured for the polyurethane in accordance with ASTM D412.

Embodiments for the laminate of the present disclosure further include those where the substrate film is the biaxially oriented polyethylene terephthalate film having a thickness of 8 to 20 μm. Embodiments for the laminate of the present disclosure further include those where the substrate film is the biaxially oriented polypropylene film having a thickness of 15 to 50 μm. Embodiments for the laminate of the present disclosure further include those where the substrate film is the biaxially oriented polyethylene film or monoaxially oriented polyethylene film having a thickness of 15 to 50 μm. Embodiments for the laminate of the present disclosure further include those where the propylene-ethylene copolymer TPE has a melt temperature of 50 to 130° C. taken at a DSC Tm peak.

Embodiments for the laminate of the present disclosure further include those where the propylene-ethylene copolymer TPE has a flexural modulus of 20 to 60 mega-Pascals (MPa) measured according to ASTM D790. Embodiments for the laminate of the present disclosure further include those where the first polyolefin composition has 90 wt. % of the HDPE resin and 10 wt. % of the propylene-ethylene copolymer TPE. Embodiments for the laminate of the present disclosure further include those where the first layer has a thickness of 30 to 150 μm. Embodiments for the laminate of the present disclosure further include those where the adhesive layer has a thickness of 1 to 5 μm. Embodiments for the laminate of the present disclosure further include those where the first polyolefin composition includes 5 to 15 wt. % of the propylene-ethylene copolymer TPE. For the various embodiments, the sealant layer can be formed from the polyethylene as described herein.

Embodiments of the present disclosure also provide for a package that includes the laminate as provided herein. For example, in one embodiment the package that includes the laminate is a stand-up pouch. Embodiments of the present disclosure also provide for a method of making the laminate as provided herein, the method including forming a film from the first polyolefin composition by one or more of film blowing and film casting processes.

DETAILED DESCRIPTION

Figure 1:
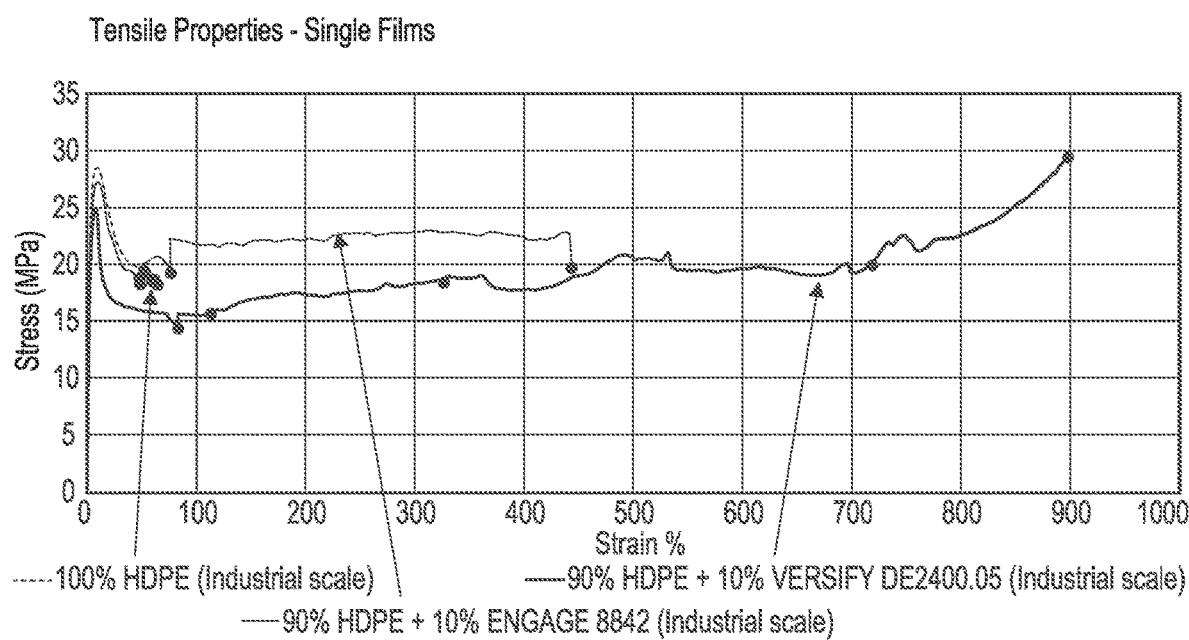
FIG. 1 provides machine direction stress/strain data for single films of examples and comparative examples of the present disclosure.

The present disclosure provides for a multilayer film having a first layer and a sealant layer, and a laminate that includes the multilayer film. The multilayer film of the present disclosure can help to achieve a high stiffness and high toughness in the laminate due in part to the first layer formed from a first polyolefin composition. The balance of stiffness and toughness provided by the first layer is also surprisingly improved relative to the use of other elastomers, as discussed herein. One primary application of the laminate having the multilayer film is in stand-up pouches, where improvements in the balance of stiffness and toughness are needed. The laminate having the multilayer film may also be useful for other types of applications such as heavy-duty shipping sacks.

For the various embodiments, the multilayer film of the present disclosure includes a first layer formed from a first polyolefin composition and a sealant layer on the first layer. The first polyolefin composition of the present disclosure consists essentially of a high density polyethylene (HDPE) resin and a propylene-ethylene copolymer thermoplastic elastomer (TPE). Specifically, the first layer is formed from a first polyolefin composition consisting essentially of (a) 80 to 99.9 weight percent (wt. %) of the HDPE resin having a density from 0.935 to 0.966 g/cm³ measured according to ASTM D792 and a melt index ($I_2$) of 0.3 to 8 g/10 minutes measured at 190° C./2.16 kg according to ASTM D-1238, the wt. % based on the total weight of the first polyolefin composition, and (b) 0.1 to 20 wt. % of the propylene-ethylene copolymer TPE comprising at least 60 wt. % of units derived from propylene and at least 0.1 wt. % of units derived from ethylene and having a density of 0.850 to 0.900 g/cm³ measured according to ASTM D792 and a melt index, $I_2$, of 0.1 to 15 g/10 minutes measured at 230° C./2.16 kg according to ASTM D-1238, the wt. % based on the total weight of the first polyolefin composition.

For the various embodiments, the sealant layer of the multilayer film can comprise a polyethylene or a blend of polyethylenes. In some embodiments, the sealant layer of the multilayer film comprises from 50 to 100 percent by weight of a polyethylene having a density from 0.880 to 0.915 g/cm³, a melt index, $I_2$, of 0.5 to 5 g/10 minutes measured at 190° C./2.16 kg according to ASTM D-1238, a peak melting point in a range of from 85° C. to 105° C. taken at a DSC Tm peak, and a molecular weight distribution, Mw/Mn range of 2.0 to 3.0. In some embodiments, the sealant layer comprises a blend of linear low density polyethylene and polyolefin plastomer. It is understood, however, that the sealant layer can comprise only a single polyolefin component for the sealant layer (e.g., the sealant layer is formed from 100 weight percent of the linear low density polyethylene or 100 weight percent polyolefin plastomer).

As used herein, "consisting essentially of" or "consist essentially of" are intended to limit the scope of the present disclosure to the specified materials of the first polyolefin composition provided herein and those that do not materially affect the basic characteristics of the first polyolefin composition used in the first layer of the present disclosure. As provided herein, the basic and novel characteristics are provided in the HDPE resin section of the disclosure, below.

The term "composition," as used herein, includes a mixture of materials which comprise the composition, as well as reaction products and decomposition products formed from the materials of the composition.

As used herein, the term "multilayer film" refers to a sheet, web or the like or combinations thereof, having length and breadth dimensions and having two major surfaces with a thickness there between. A multilayer film has two or more layers that are bonded together by one or more of the following methods: coextrusion, extrusion coating, vapor deposition coating, solvent coating, emulsion coating, or suspension coating.

As used herein, the term "laminate" refers to a combination of two or more individually formed films and/or multilayer films that are then bonded together, e.g. with an adhesive.

The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

"Polyethylene" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single site catalyzed Linear Low Density Polyethylene, including both linear and substantially linear low density resins (m-LLDPE); and High Density Polyethylene (HDPE). These polyethylene materials are generally known in the art; however the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference). LDPE resins typically have a density in the range of 0.916 to 0.940 g/cm$^3$.

The term "polyolefin plastomer", as used herein, refers to a polymer material having the qualities of both an elastomer and a plastic, where examples of such polyolefin plastomers include linear low density polyethylenes, propylene-ethylene copolymers and ethylene-alpha olefin copolymers that have a density of 0.870 to 0.905 g/cm$^3$ and a melting point (determined using DSC, DOW method) of 55° C. to 108° C.

The term "LLDPE", includes both resin made using the traditional Ziegler-Natta catalyst systems as well as single-site catalysts such as metallocenes (sometimes referred to as "m-LLDPE") and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or U.S. Pat. No. 5,854,045). The Linear PE can be made via gas-phase, solution-phase or slurry polymerization or any combination thereof, using any type of reactor or reactor configuration known in the art, with gas and slurry phase reactors being most preferred.

The term "HDPE" refers to polyethylenes having densities greater than about 0.940 g/cm$^3$, which are generally prepared with Ziegler-Natta catalysts, chrome catalysts or even metallocene catalysts.

The following analytical methods are used in the present invention:

Density is determined in accordance with ASTM D792.

"Melt index" also referred to as "$I_2$" is determined according to ASTM D-1238 (measured at either 230° C., 2.16 kg or 190° C., 2.16 kg as provided herein).

Peak melting point is determined by Differential Scanning calorimeter (DSC) where the film (0.1 to 0.2 mil thick, 3-10 mg, 6 mm diameter sample) is conditioned at 180° C. for 5 minutes prior to cooling at a rate of 10° C. per minute to a temperature of −40° C. After the film is kept at −40° C. for 5 minutes, the film is heated to 200° C. at a rate of 10° C. per minute.

The term molecular weight distribution or "MWD" is defined as the ratio of weight average molecular weight to number average molecular weight (Mw/Mn)—Mw and Mn are determined according to methods known in the art using conventional gel permeation chromatography (conventional GPC).

HDPE Resin of First Layer

The HDPE resin of the first layer has a density from 0.935 to 0.966 g/cm$^3$ measured according to ASTM D792 and a melt index ($I_2$) of 0.3 to 8 g/10 minutes measured at 190° C./2.16 kg according to ASTM D-1238. For the various embodiments, the HDPE resin can have additional density and $I_2$ values. For example, the HDPE resin of the first layer can have a density from 0.945 to 0.966 g/cm$^3$ measured according to ASTM D792 and an $I_2$ of 0.3 to 2 g/10 minutes measured at 190° C./2.16 kg according to ASTM D-1238. Preferably, the HDPE resin has a density from 0.955 to 0.966 g/cm$^3$ measured according to ASTM D792 and an $I_2$ of 0.4 to 1 g/10 minutes measured at 190° C./2.16 kg according to ASTM D-1238. In some embodiments, the HDPE resin has a density from 0.955 to 0.966 g/cm$^3$ measured according to ASTM D792 and an $I_2$ of 0.5 to 1 g/10 minutes measured at 190° C./2.16 kg according to ASTM D-1238. In some embodiments, the HDPE resin has a density from 0.962 to 0.966 g/cm$^3$ measured according to ASTM D792 and an $I_2$ of 0.8 to 0.9 g/10 minutes measured at 190° C./2.16 kg according to ASTM D-1238.

For the various embodiments, the HDPE resin also has a modulus of elasticity of 500 to 2000 MPa, where the modulus of elasticity is measured according to ASTM D882-18. The modulus of elasticity tested under ASTM D882-18 provides an index of the stiffness of a thin sheet (e.g., from 0.1 mm to 0.25 mm) of the HDPE resin, where a toughness of the HDPE resin can be taken as the total energy absorbed per unit volume of the thin sheet of the HDPE resin up to the point of rupture. In some embodiments, the HDPE resin has a modulus of elasticity of 700 to 1500 MPa, where the modulus of elasticity is measured according to ASTM D882-18. In some embodiments, the HDPE resin has a modulus of elasticity of 1000 to 1200 MPa, where the modulus of elasticity is measured according to ASTM D882-18.

The HDPE resin of the present disclosure can have a unimodal molecular weight distribution or a bimodal weight distribution. For the various embodiments, the HDPE resin of the present disclosure can be formed via gas-phase, solution-phase or slurry polymerization or combinations thereof, using known reactor or reactor configurations in the art. The HDPE can be formed as substantially linear ethylene polymers; homogeneously branched linear ethylene polymers, heterogeneously branched ethylene polymers and/or blends thereof.

Commercial examples of the HDPE resin include those sold under the trade designator ELITE™ available from The Dow Chemical Company. Specific examples of ELITE™ HDPE resins include ELITE™ 5960G, among others.

Propylene-Ethylene Copolymer Thermoplastic Elastomer (TPE) of First Layer

The propylene-ethylene copolymer thermoplastic elastomer (TPE) of the present disclosure is a non-functionalized propylene-ethylene copolymer, which may include propylene-ethylene alternating copolymers. A TPE contains at least two segments, one thermoplastic and the other elastomeric, which helps to provide the propylene-ethylene copolymer TPE with the properties of an elastomer that can be stretched beyond its original length and also the ability to retract to substantially its original length when released. The propylene-ethylene copolymer thermoplastic elastomer TPE can also be processed like a thermoplastic with the ability to soften when exposed to heat and return to substantially its original condition when cooled to room temperature.

As discussed herein, the first polyolefin composition of the present disclosure is formulated with the propylene-ethylene copolymer TPE resin to enhance the overall property of toughness and stiffness balance of multilayer films formed with the composition. The propylene-ethylene copolymer TPE constitutes 0.1 to 20 wt. % of the first polyolefin composition. In some embodiments, the propylene-ethylene copolymer TPE constitutes 5 to 15 wt. % of the first polyolefin composition. In some embodiments, the propylene-ethylene copolymer TPE constitutes 5 to 10 wt. % of the first polyolefin composition.

For the various embodiments, the propylene-ethylene copolymer TPE resin includes at least 60 wt. % of units derived from propylene and at least 0.1 wt. % of units derived from ethylene. For example, the propylene-ethylene copolymer TPE resin can include 60 wt. % to 99.9 wt. % of units derived from propylene and 40 wt. % to 0.1 wt. % of units derived from ethylene. All individual values and subranges from 60 wt. % to 99.9 wt. % of units derived from propylene and 40 wt. % to 0.1 wt. % of units derived from ethylene are included and disclosed herein. For example, units of the propylene-ethylene copolymer TPE resin derived from propylene can be from a lower limit of 60, 65, 70 or 75 wt. % to an upper limit of 80, 85, 90, 95 or 99.9 wt. %, while units of the propylene-ethylene copolymer TPE resin derived from ethylene can be from a lower limit of 0.1, 5, 10, 15 or 20 wt. % to an upper limit of 25, 30, 35 or 40 wt. %. Specific examples include the propylene-ethylene copolymer TPE resin derived from propylene in a range of 60 to 99.9 wt. %, and the units derived from ethylene are from 0.1 to 40 wt. %. Preferably, the propylene-ethylene copolymer TPE resin derived from propylene in a range of 65 to 95 wt. %, and the units derived from ethylene are from 5 to 35 wt. %. More preferably, the propylene-ethylene copolymer TPE resin derived from propylene in a range of 65 to 95 wt. %, and the units derived from ethylene are from 5 to 35 wt. %.

The propylene-ethylene copolymer TPE resin has a density of 0.850 to 0.900 g/cm$^3$ measured according to ASTM D792 and a melt index, $I_2$, of 0.1 to 15 g/10 minutes measured at 230° C./2.16 kg according to ASTM D-1238. All individual values and subranges of the density of 0.850 to 0.900 g/cm$^3$ and the melt index, $I_2$, of 0.1 to 15 g/10 minutes measured at 230° C./2.16 kg are provided herein. For example, the propylene-ethylene copolymer TPE resin can have a density from a lower limit of 0.850, 0.855 or 0.860 g/cm$^3$ measured according to ASTM D792 to an upper of 0.865, 0.870, 0.875, 0.880, 0.885 or 0.900 g/cm$^3$ measured according to ASTM D792. Specific examples include a density in the range of 0.855 to 0.895 g/cm$^3$ measured according to ASTM D792; 0.860 to 0.885 g/cm$^3$ measured according to ASTM D792; or 0.862 to 0.865 g/cm$^3$ measured according to ASTM D792.

The propylene-ethylene copolymer TPE resin may have a melt index ($I_2$) in the range of from 0.1 to 5 g/10 min, measured in accordance with ASTM D-1238 (at 230° C./2.16 Kg). All individual values and subranges from 0.1 to 5 g/10 min are included and disclosed herein; for example, the $I_2$ can be from a lower limit of 0.1, 0.2, 0.5, 1.0 or 1.5 to an upper limit of 5, 4, 3 or 2.5 g/10 min. For example, the propylene-ethylene copolymer TPE resin may have an $I_2$ in the range of 0.5 to 3 g/10 min, or in the alternative, 1.5 to 2.5 g/10 min.

The propylene-ethylene copolymer TPE resin has a molecular weight distribution (MWD), defined as weight average molecular weight divided by number average molecular weight (Mw/Mn) of 3.5 or less; in the alternative 3.0 or less; or in another alternative from 1.8 to 3.0.

The propylene-ethylene copolymer TPE resin may have a flexural modulus (1% Secant) of 20 to 60 mega-Pascals (MPa) measured according to ASTM D790. All individual values and subranges from 20 to 60 MPa are included and disclosed herein; for example, the flexural modulus can be from a lower limit of 20, 25, 30 or 35 to an upper limit of 60, 55, 50 or 45 MPa. For example, the propylene-ethylene copolymer TPE resin may have a flexural modulus in the range of 25 to 55 MPa, or in the alternative, 35 to 45 MPa.

Particularly desirable propylene-ethylene copolymer TPEs have a melting temperature of 50 to 130° C. as measured using differential scanning calorimetry (DSC) as is known in the art, where the melting temperature (Tm) is taken as the DSC peak. The melting temperature at the DSC peak is determined by Differential Scanning calorimeter (DSC) where the film (0.1 to 0.2 mil thick, 3-10 mg, 6 mm diameter sample) is conditioned at 180° C. for 5 minutes prior to cooling at a rate of 10° C. per minute to a temperature of −40° C. After the film is kept at −40° C. for 5 minutes, the film is heated to 200° C. at a rate of 10° C. per minute.

Examples of such a non-functionalized propylene-ethylene copolymer include, but are not limited to, VERSIFY™ DE-2400.05, available from The Dow Chemical Company.

Sealant Layer

For the various embodiments, the sealant layer refers to at least one of the external or outer layers of the multilayer film and/or laminate, as provided herein, where the sealant layer is involved in the sealing of the multilayer film or laminate to itself or a package (e.g., a stand-up pouches) so as to be in contact with and close the package.

For various embodiments, the sealant layer of the multilayer film can comprise a polyethylene or a blend of polyethylenes. For example, for the various embodiments the sealant layer comprises from 50 to 100 percent, preferably at least 60, 70, 80, 90 or even 100 percent by weight of a polyethylene having a density from 0.880 to 0.915 g/cm$^3$, preferably from 0.895 to 0.905 g/cm$^3$, a melt index, $I_2$, of 0.5 to 5 g/10 minutes, preferably 0.8 to 1.2 dg/min, more preferably 0.9 to 1.1 dg/min, measured at 190° C./2.16 kg according to ASTM D-1238, and a peak melting point in a range of from 85° C. to 105° C., preferably 90° C. to 100° C., taken at a DSC Tm peak, and a molecular weight distribution, Mw/Mn range of 2.0 to 3.0. In some embodiments, the sealant layer comprises a blend of linear low density polyethylene and polyolefin plastomer. Preferably, when present the polyolefin plastomer is preferably a polyethylene plastomer. It is understood, however, that the sealant layer can comprise only a single polyethylene component for the sealant layer (e.g., the sealant layer is formed from 100 weight percent of the linear low density polyethylene or 100 weight percent of a polyolefin plastomer).

Preferably, the polyethylene or blend of polyethylenes provide the sealant layer with a heat seal strength of at least 25 N/25 mm, more preferably at least 30 still more preferably at least 35 N/25 mm at 90° C. It is also preferred that the sealant layer has a thickness in the range of 5 to 15 microns, preferably in the range of from 10 to 15 microns.

The sealant layer can also comprise other possible polyolefin compositions. Examples of these other polyolefin compositions include ethylene vinyl acetate (EVA) and ethylene methyl acrylate (EMA) copolymers, which are known to provide heat sealing properties and can be made peelable with the incorporation of polybutylene or ionomers. Propylene based elastomers or plastomers (such as the VERSIFY™ family of resins available from the Dow Chemical Company) particularly when mixed with a second polymer from a group preferably consisting of polyethylene and styrenic polymers, have a seal strength in the range that make them well suited for use as a sealant layer in some embodiments. Layers of a linear low density polyethylene (LLDPE) can also be used as the sealant layer, whereupon the thickness of the sealant layer can be used to determine the peel force required to open the seal.

First Polyolefin Composition

For the various embodiments, the first polyolefin composition of the present disclosure consists essentially of (a) 80 to 99.9 weight percent (wt. %) of the HDPE resin and (b) 0.1 to 20 wt. % of the propylene-ethylene copolymer TPE, both as provided herein, where the wt. % values are based on the total weight of the first polyolefin composition. All individual values and subranges from (a) 80 to 99.9 wt. % of the HDPE resin and (b) 0.1 to 20 wt. % of the propylene-ethylene copolymer TPE are included and disclosed herein. For example, preferably the first polyolefin composition of the present disclosure consists essentially of (a) 90 to 98 wt. % of the HDPE resin and (b) 2 to 10 wt. % of the propylene-ethylene copolymer TPE, both as provided herein, where the wt. % values are based on the total weight of the first polyolefin composition. In one specific embodiment, the first polyolefin composition has 90 wt. % of the HDPE resin and 10 wt. % of the propylene-ethylene copolymer TPE.

As discussed above, the first polyolefin composition of the present disclosure consists essentially of the (a) HDPE resin and (b) the propylene-ethylene copolymer TPE, both as provided herein. The "consisting essentially of" or "consist essentially of" limit the scope of the present disclosure to the specified materials of the first polyolefin composition provided herein and those that do not materially affect the basic characteristics of the first polyolefin composition used in the first layer of the present disclosure. Other components that can be added to the first polyolefin composition of the present disclosure that do not materially affect the basic characteristics of the first polyolefin composition used in the first layer of the present disclosure include additives known in the art such as inorganic fillers, conductive fillers, pigments, nucleators, clarifiers, antioxidants, acid scavengers, oxygen scavengers, flame retardants, ultraviolet absorbers, processing aids such as zinc stearate, extrusion aids, slip additives, permeability modifiers, anti-static agents, antiblock additives, and combinations thereof. Such additives can be present in typical amounts of up to 10 weight percent of the first polyolefin composition.

As discussed herein, the multilayer film of the present disclosure includes two or more layers that are bonded together by one or more of the following methods: coextrusion, extrusion coating, vapor deposition coating, solvent coating, emulsion coating, or suspension coating. The multilayer film of the present disclosure includes the first layer formed from the first polyolefin composition and the sealant layer on the first layer. For the various embodiments, the multilayer film can include more than one (e.g., two or more) of each of the first layers and the sealant layer. For example, the sealant layer can be a first external layer of the multilayer film, where a first of the first layer can be a second external layer and a second of the first layer can be a core layer between the first and second external layers of the multilayer film. In such an embodiment, the first polyolefin composition of the first of the first layer and the second of the first layer can be the same or different according to the intended purpose for the multilayer film. In an additional embodiment, the multilayer film can include one or more of the first layers, the sealant layer and an additional layer, where the sealant layer and the first layer provide the external layers of the multilayer film and the additional layer provides one or more core layers. For such embodiments, the additional layer can be a polyolefin that is compositionally different from either of the first polyolefin composition of the first layer(s) and that of the sealant layer. In an additional embodiment, the multilayer film can include one or more of the first layers, the sealant layer and the additional layer, where the sealant layer and the additional layer provide the external layers of the multilayer film and the first layer provides one or more core layers. For such embodiments, the additional layer can be a polyolefin that is compositionally different from either of the first polyolefin composition of the first layer(s) and that of the sealant layer. The additional layer(s) may advantageously comprise a polymeric material selected from the group consisting of propylene based plastomers or elastomers, propylene homopolymers, medium density polyethylene (MDPE), high density polyethylene (HDPE), linear low density polyethylene (LLDPE), low density polyethylene (LDPE), ethylene based plastomers or elastomers or blends thereof. Such additional layers, when present, may be selected to provide additional functionality as is generally known in the art.

The multilayer film of the present disclosure can have a total thickness in a range of 10 µm to 400 µm. All individual values and subranges from 50 µm to 400 µm are included herein and disclosed herein; for example, the total thickness may have a lower limit of 50, 60, 70 or 80 µm to an upper limit of 200, 300, 350 or 400 µm. For example, the multilayer film can be from 60 µm to 350 µm, or in the alternative, from 70 µm to 300 µm, or in the alternative from 80 µm to 200 µm.

As discussed herein, the first layer formed from the first polyolefin composition has a thickness of 30 to 150 micrometers (µm). For the various embodiment, the first layer formed from the first polyolefin composition can represent from 30 to 70% of the total thickness of the multilayer film. All individual values and subranges from 30 to 70% are included herein and disclosed herein; for example, the first layer may represent a percentage thickness of the total multilayer film thickness from a lower limit of 30, 35 or 40 to an upper limit of 55, 65 or 70%. For example, the first layer can be from 30 to 70% of the total film thickness, or in the alternative, from 40 to 65%, or in the alternative, from 50 to 65%.

The multilayer film of the present disclosure can be formed using processes generally known in the art including blown films and cast films, in which the individual layers can be coextruded. In some embodiments, the multilayer film of the present disclosure can also be oriented in the machine direction or the cross direction, or both the machine and cross direction following the film forming step.

Laminate

The present disclosure also provides for a laminate that includes (i) a substrate film comprising a biaxially oriented polyethylene terephthalate film, a biaxially oriented polypropylene film or an oriented polyethylene film; (ii) the multilayer film as provided herein; and (iii) an adhesive layer comprising polyurethane in adhering contact with the substrate film and the first layer of the multilayer film as provided herein, where when the adhesive layer is formed from a solvent-free adhesive the adhesive layer has an elastic modulus of greater than 25 MPa, and when the adhesive layer is formed from a solvent-based adhesive the adhesive layer has an elastic modulus of greater than 0.30 MPa, the elastic modulus being measured for the polyurethane in accordance with ASTM D412.

As used herein, the term "laminate" refers to a combination of two or more individually formed films and/or multilayer films that are then bonded together, e.g. with the adhesive layer. The term "adhesive layer" means an inner layer having a primary purpose of providing interlayer adhesion to directly adjacent or contiguous layers, for instance between the layers of the multilayer film and the substrate film, both as provided herein.

For the various embodiments, the laminate of the present disclosure can be formed by laminating (i) the substrate film, (ii) the multilayer film and (iii) the adhesive layer, which is in adhering contact with the substrate film and the first layer of the multilayer film, each of (i), (ii) and (iii) are as provided herein. Processes for such a lamination process include extrusion lamination processes as are known in the art.

Substrate Film

The substrate film of the laminate can be a biaxially oriented polyethylene terephthalate film, a biaxially oriented polypropylene film or a monoaxially oriented polyethylene film. For the various embodiments, the substrate film can preferably be the biaxially oriented polyethylene terephthalate film having a thickness of 8 to 20 µm. In an alternative embodiment, the substrate film can be the biaxially oriented polypropylene film having a thickness of 15 to 50 µm. The substrate film can also be the biaxially oriented polyethylene film or a monoaxially oriented polyethylene film having a thickness of 15 to 50 µm.

Adhesive Layer

As provided herein, the adhesive layer comprises a polyurethane in adhering contact with the substrate film and the first layer. In some embodiments, the adhesive layer can be formed from a solvent-free adhesive or a solvent-based adhesive. For the embodiments, the adhesive layer is located between and in direct contact with the substrate film and the first layer of the first polyolefin composition, without any intervening coatings or layers being applied between the substrate film and the first layer. The film surfaces that will be coated with adhesive layer can be corona treated to increase surface energy and provide enough wettability for the adhesive components.

In some embodiments, the adhesive layer comprises a polyurethane. In one or more embodiments, the adhesive is a two component polyol and isocyanate mixture with optional components such as catalysts and diluents. An exemplary solvent-less laminate bi-component adhesive includes a polyurethane that includes a first component that is an isocyanate terminated prepolymer. The second component of the polyurethane is a polyester/polyether that is made with linear and difunctional polyols. An exemplary solvent based adhesive layer comprises a polyurethane that includes a first component that is a 100% polyester based with methyl ethyl ketone as a diluent. The second component is an isocyanate-terminated prepolymer. For example, the solvent-free adhesives suitable for use may include, by way of example and not limitation, two-component polyurethane adhesive systems using commercially available components from The Dow Chemical Company (Midland, MI, USA) under the names MOR-FREE™, including (1) MOR-FREE™ 698A+MOR-FREE™ C79 or (2) MOR-FREE™ 698A+polypropylene glycol (e.g., Mn 446). Examples of solvent-based adhesives suitable for use may include, by way of example, and without limitation, two component polyurethane adhesive systems using commercially available components from The Dow Chemical Company such as (1) ADCOTE™ 563EA+Catalyst F or (2) ADCOTE™ 811+MOR-FREE™ 200C. The above adhesive layer compositions provide for an adhesive layer having an elastic modulus of greater than 25 MPa when the adhesive layer is formed from a solvent-free adhesive, and when the adhesive layer is formed from a solvent-based adhesive the adhesive layer has an elastic modulus of greater than 0.30 MPa. The elastic modulus is measured for the polyurethane in accordance with ASTM D412.

For the various embodiments, the adhesive layer can have a thickness of 1 to 5 µm. In certain embodiments, the adhesive layer has a weight per square meter of about 0.5 $g/m^2$ to 5 $g/m^2$, more preferably from 1 $g/m^2$ to 3 $g/m^2$. The adhesive layer can be applied to the first and second film in any suitable manner. For example, the methods of the present disclosure may include, by way of example and not limitation, the use of a laminating machine, gravure coating, roll coating, wire rod coating, flexographic printing, spray coating, screen printing, and the like.

Film Forming Techniques

The multilayer film and/or the laminate of the present disclosure of the present disclosure can be formed using techniques known in the art. For example, the multilayer film with both the first layer made from the first polyolefin composition and the sealant layer made from the polyolefin composition provided in the present disclosure can be made using conventional simple bubble or cast extrusion techniques as well as by using more elaborate techniques such as "tenter framing" or the "double bubble" process. "Stretched" and "oriented" are used in the art and herein interchangeably, although orientation is actually the consequence of a film being stretched by, for example, internal air pressure pushing on the tube or by a tenter frame pulling on the edges of the film.

Simple blown bubble film processes are described, for example, in The Encyclopedia of Chemical Technology, Kirk-Othmer, Third Edition, John Wiley & Sons, New York, 1981, Vol. 16, pp. 416-417 and Vol. 18, pp. 191-192, the disclosures of which are incorporated herein by reference. Processes for manufacturing biaxially oriented film such as the "double bubble" process described in U.S. Pat. No. 3,456,044 (Pahlke), and other suitable processes for preparing biaxially stretched or oriented film are described in U.S. Pat. No. 4,865,902 (Golike et al.), U.S. Pat. No. 4,352,849 (Mueller), U.S. Pat. No. 4,820,557 (Warren), U.S. Pat. No. 4,927,708 (Herran et al.), U.S. Pat. No. 4,963,419 (Lustig et al.), and U.S. Pat. No. 4,952,451 (Mueller), the disclosures of each of which are incorporated herein by reference. The multilayer film structures can also be made as described in a tenter-frame technique, such as that used for oriented polypropylene.

For the blown bubble processes, the multilayer film of the present disclosure can be formed using a high blow-up ratios, e.g., at greater or equal to 2.5:1. Blow-Up Ratio, abbreviated herein as "BUR", is calculated by the equation: BUR=Bubble Diameter/Die Diameter. Other multi-layer film manufacturing techniques include those described in Packaging Foods With Plastics, by Wilmer A. Jenkins and James P. Harrington (1991), pp. 19-27, and in "Coextrusion Basics" by Thomas I. Butler, Film Extrusion Manual: Process, Materials, Properties pp. 31-80 (published by TAPPI Press (1992)) the disclosures of which are incorporated herein by reference.

The laminate of the present disclosure can also be formed from known techniques. Processes for such a lamination process include extrusion lamination processes as are known in the art, where the lamination process to join the layers is done in a secondary operation to the multilayer film forming process. The lamination process joins the multilayer film with the substrate film using the adhesive layer, each as provided herein, where such processes are as described by K. R. Osborn and W. A. Jenkins in "Plastic Films, Technology and Packaging Applications" (Technomic Publishing Co., Inc. (1992)). The multilayer film and/or the laminate can also go through other post extrusion techniques, such as a biaxial orientation process.

Other layers can also be included in this laminate forming process. For example, the laminate of the present disclosure can also include other layers, which include but are not limited to barrier layers, and/or tie layers, and/or structural layers. Various materials can be used for these layers, with some of them being used as more than one layer in the same laminate structure. Some of these materials include: foil, nylon, ethylene/vinyl alcohol (EVOH) copolymers, polyvinylidene chloride (PVDC), polyethylene terephthalate (PET), oriented polypropylene (OPP), ethylene/vinyl acetate (EVA) copolymers, ethylene/acrylic add (EAA) copolymers, ethylene/methacrylic add (EMAA) copolymers, LLDPE, HDPE, LDPE, nylon, graft adhesive polymers (e.g., maleic anhydride grafted polyethylene), and paper.

For the various embodiments, the laminate may also include a toner or ink image printed on at least one layer of the laminate. In certain embodiments, an external surface of the laminate can include printing. Other surfaces of one or more of the films and/or multilayer films of the laminate can also include printing. Printing on the laminate can be accomplished using machinery and processes known in the art, such as using corona printing, a digital press, and liquid toner/ink.

Embodiments of the present disclosure also provide for a package comprising the laminate as provided herein, where such packaging can be used for liquids, solids and/or particulates, such as beverages, foods, cosmetics, and medicines. The package may have any format suitable for holding liquids and/or solids, including but not limited to, flexible packaging, pouches, bags, and stand-up pouches. In one embodiment, the package comprising the laminate is a stand-up pouch. Other package structures include, but are not limited to, flexible packages formed from any of the first layer and/or laminate disclosed herein. In a particular aspect, the package is amenable to processing on conventional packaging equipment, including for example, VFFS, HFFS, and Doypack equipment.

Examples

Some embodiments of the present disclosure will now be described in detail in the following Examples, where all parts and percentages are by weight unless otherwise specified. In the Examples, the following materials and tests are used.

TABLE 1

Materials

| Polymer | Producer | Type | Modulus[1] | MFI[2] (g/10min) | Density[3] (g/cm$^3$) |
|---|---|---|---|---|---|
| ELITE ™ 5960 | The Dow Chemical Company (DOW) | Polyethylene Resin | ~1100 MPa (secant, MD, 1%) | 0.85 (190° C., 2.16 kg) | 0.962 |
| ELITE ™ 5940ST | (DOW) | Polyethylene Resin | | | |
| ENGAGE ™ 8842 Polyolefin Elastomer | DOW | Ethylene/α-olefin (EO) Copolymer | 4.0 MPa (Secant) | 1 (190° C., 2.16 kg) | 0.857 |
| ENGAGE XLT ™ 8677 | DOW | EO Block Copolymer | 6.6 MPa (Secant) | 1 (190° C., 2.16 kg) | 0.866 |
| INFUSE ™ 9107 Polyolefin Elastomer | DOW | EO Block Copolymer | 4.0 MPa (Secant) | 2.8 (190° C., 2.16 kg) | 0.862 |
| VERSIFY ™ DE2400.05 Elastomer | DOW | Propylene/Ethylene Copolymer | 41 MPa (Flexural) | 2 (230° C., 2.16 kg) | 0.863 |
| VERSIFY ™ 2300 Elastomer | DOW | Propylene/Ethylene Copolymer | 62 MPa (Flexural) | 2 (230° C., 2.16 kg) | 0.867 |
| AFFINITY ™ PL 1881G | DOW | Ethylene/Octene Copolymer | 80 MPa (Secant) | 1 (190° C., 2.16 kg) | 0.904 |
| DOWLEX ™ NG 5056G | DOW | Linear Low Density Polyethylene (LLDPE) | 198 MPa (Secant, 2%, MD) | 1.1 (190° C., 2.16 kg) | 0.919 |
| MOR-FREE ™ 698 A (MF 698) | DOW | Solventless two-component polyurethane adhesive system | — | — | — |
| MOR-FREE ™ C79 (MF C79) | DOW | Solventless two-component polyurethane adhesive system | — | — | — |
| MOR-FREE ™ 200C (MF 200C) | DOW | Solventless two-component polyurethane adhesive system | — | — | — |
| MOR-FREE ™ L-PLUS (L+) | DOW | Solventless two-component polyurethane adhesive system | | | |

TABLE 1-continued

Materials

| Polymer | Producer | Type | Modulus[1] | MFI[2] (g/10min) | Density[3] (g/cm³) |
|---|---|---|---|---|---|
| CR 121 | DOW | Component of Solvent two-component polyester/isocyanate adhesive system | | | |
| PPG 400 | | Polyether Polyol | — | — | — |
| ADCOTE ™ 563 EA | DOW | Solvent two-component polyester/isocyanate adhesive system | — | — | — |
| Catalyst F (Cat F) | DOW | Component of Solvent two-component polyester/isocyanate adhesive system | | | |
| ADCOTE ™ A 811 EA | DOW | Solvent two-component polyester/isocyanate adhesive system | — | — | — |

[1]Modulus measured according to ASTM D882.
[2]MFI measured according to ASTM D-1238.
[3]Density measured according to ASTM D792.

Polyolefin Composition, First layers and Methods Description

TABLE 2

Polyolefin Compositions

| | CE[1] A | CE B | CE C | CE D | CE E | Ex 1 |
|---|---|---|---|---|---|---|
| ELITE ™ 5960 | 100 | 90 | 80 | 90 | 90 | 90 |
| ENGAGE ™ 8842 | | 10 | 20 | | | |
| ENGAGE XLT ™ 8677 | | | | 10 | | |
| INFUSE ™ 9107 | | | | | 10 | |
| VERSIFY ™ DE2400.05 | | | | | | 10 |

[1]Reference Polyolefin Compositions (Comparative Example—CE; Example = Ex; Values in weight percent based on total weight of the polyolefin composition)

Compounding of the Polyolefin Compositions

Compound the polyolefin compositions of the comparative examples (CE) and the example (Ex) seen in Table 2 using a Buss Compounder MDK/E46 (Buss AG, Switzerland) with a single mixing screw having a 46 millimeter L/D ratio. The temperature profile of the Buss Compounder was 190/200/210/210° C. and the output was 12 kg/h, with underwater pelletization and pellet drying before collection.

Production of First Layer

Produce the first layer at either lab scale using a Dr. Collin Line (60 mm die, 9 kg/h output, 230° C. die temperature and a blow up ratio of 2.5) and the polyolefin compositions of the CE and the Ex seen in Table 2, or on a large scale using an Alpine Line 3-layer Extrusion line (200 mm die, 100 kg/h output, 230° C. die temperature and a blow up ratio 2.5) where the weight percent of the HDPE resin and propylene-ethylene copolymer TPE seen in Table 2 is dry-blended directly in the extruder of the blown film line. The first layers have a thicknesses of 100 μm.

Falling Dart Impact Test

Test the first layers with the falling dart impact test according to ISO 6603-4. The falling dart impact test evaluates the impact strength or toughness of a plastic film. The falling dart impact test uses a single dart configuration and a single drop height, while varying the weight of the dart.

Flexure Testing

Test the stress-strain behavior of the first layers according to using a Zwick Z010 Universal Testing Machine (Zwick/Roell) according to ISO 178.

Modulus/Secant Modulus Testing

Determine secant modulus using a Zwick Z010 Universal Testing Machine (Zwick/Roell) according to ASTM D882.

High Speed Tensile Testing

Record high tensile testing on a Zwick Roell HIT25P (Zwick/Roell) at a speed up to 2 m/sec and with a force of 2.5 kN.

Drop Test

Conduct the drop test as follows. Use a staircase method consisting of twenty (20) drop events at different heights, where the height of the drop grows in steps of 200 cm until a failure occurs. Repeat the test, but now decrease the height for each drop event by 200 cm until the sample (e.g., the pouch) does not show a failure. The staircase method (ASTM D2463-10b test) provides the maximum non-failure height, the minimum non-failure height and the mean failure height. The mean failure height represents the height with the highest probability to have half of the tested pouches failing, and it is used to compare the samples.

Yield Stress, Necking Stress and Relative Reduction Yield to Neck Stress Tests

Conduct yield stress, necking stress and relative reduction yield to neck stress tests as flows. Prepare specimens of CE A, CE B and Ex 1 film of 70 millimeter (mm) by 15 mm. On a vibration resistant table provide a pendulum based tensile impact testing setup (25J Pendulum Ceramic Impact Measuring Instrument) instrumented to control impact speed up to 3.8 m/sec, which is in the range of deformation speeds in packaging applications. Conduct two different impact tests on the pendulum based tensile impact testing setup for the pure film impact tensile and heat seal impact tensile. Place each specimen in its predefined location and adjust the pendulum to the desired speed (position or angle). Measure stress-strain curves, maximum test force, energy, displacement, and other test parameters of the specimens at arbitrary speeds up to 3.8 m/sec and force of 2.5 kN. Measurement frequency is up to 4 MHz per channel. Table 3 provides the results of these tests.

TABLE 3

Yield stress, Necking stress and relative reduction Yield to Neck stress

| MD Direction | Yield Stress (MPa) | Necking Stress (MPa) | Difference Yield-Neck (%) |
| --- | --- | --- | --- |
| CE A | 28.498 | 18.5 | 35.1% |
| CE B | 25.26 | 19.44 | 23.0% |
| Ex 1 | 24.92 | 16.22 | 34.9% |

FIG. 1 presents the tensile curves of a 100 μm thick film prepared on the large scale using each of the polyolefin compositions for CE A, CE B and Ex 1, as provided herein. Data for CE C, CE D and CE E showed similar tensile properties to those of CE B. In addition, machine direction (MD) data seen in Table 3 is only provided for the films prepared with CE A, CE B and Ex 1 as the results obtained in the cross direction (CD) were very similar to MD.

Toughness/Stiffness Balance

Figure 2:
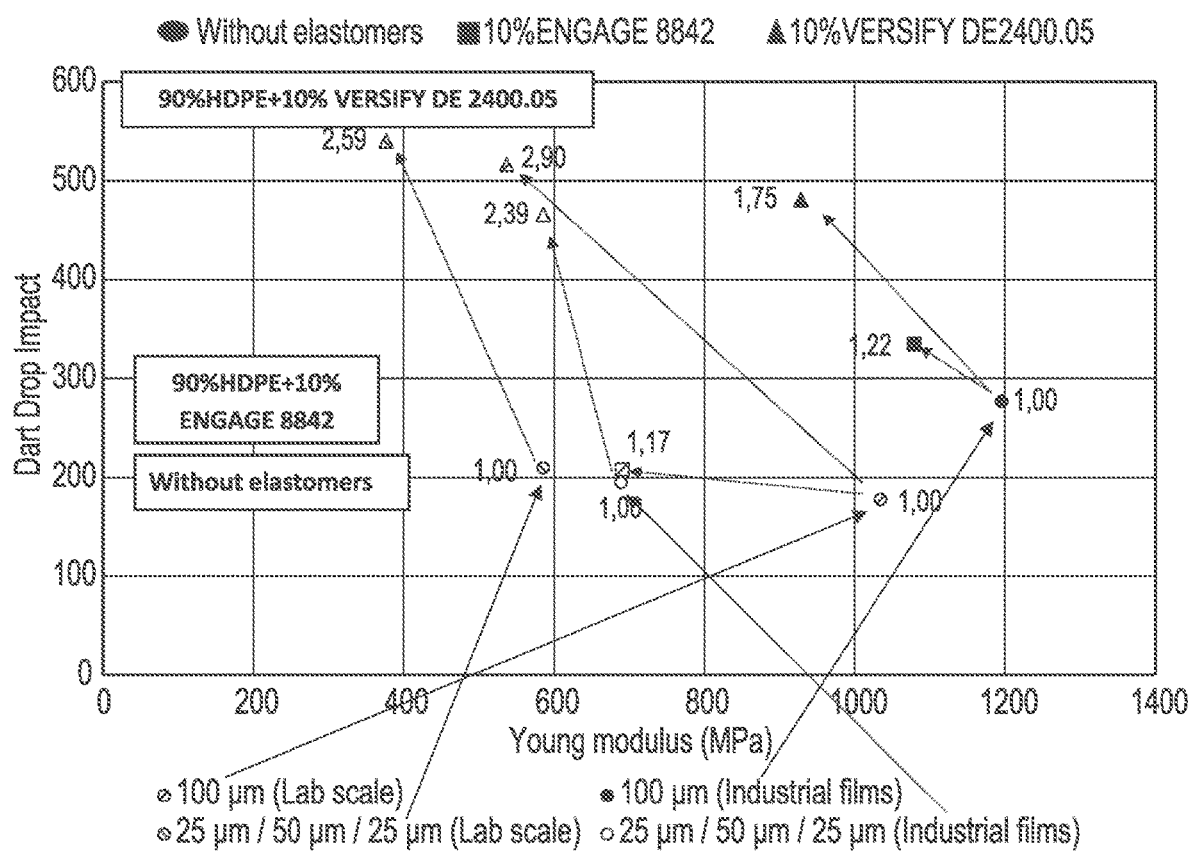
FIG. 2 provides a toughness/stiffness balance for single films and co-extruded films of examples and comparative examples of the present disclosure.

FIG. 2 presents the toughness/stiffness balance of a 100 μm thick film (single films and co-extruded films) prepared at the large scale and the lab scale, as discussed above, using each of the compound formulations for CE A, CE B and Ex 1, as provided herein. The 100 μm thick film is either a single layer of 100 μm formed with each of the compound formulations for CE A, CE B and Ex 1, or is a multi-layer film formed by co-extruding three separate layers of the same compound formulations for either CE A, CE B or Ex 1.

As seen in FIG. 2, there is a large and surprising increase in the toughness of the films formed with the compound formulation of Ex 1 as compared to the films formed with either CE A or CE B. This observation is valid for films made at the lab scale: single 100 μm film (dart drop energy×2.90), co-extruded films (dart drop energy×2.59) or large scale: single 100 μm film (dart drop energy×1.75), co-extruded films (dart drop energy×2.39). This data highlights the toughness performance of VERSIFY™ DE2400.05 (Ex 1) as compared to other thermoplastic polyolefin elastomer (TPE) such as ENGAGE™ 8842 (CE B), with which the dart drop performance are only multiplied by 1.17 to 1.22, depending on the type of film studied.

The addition of TPE also affects the stiffness. The addition of 10% of VERSIFY™ DE2400.05 in Ex 1 leads to a decrease of 20% of young modulus at the large scale, which is in the range of the expected decrease of stiffness with the use of this concentration of TPE in an HDPE matrix.

Laminates with PET/Mono-Extruded Films and PET/Co-Extruded Films

Commercially available bioriented PET films (BOPET) with a thickness of 12 micron were used. The films were purchased from Mitsubishi Polyester Film under the trade name HOSTAPHAN. Laminates of the BOPET with the coextruded and mono-extruded films were produced on a NORDMECCANICA LABOCOMBI L400 using the lamination adhesives systems in Table 1.

BOPET/mono-extruded films and BOPET/co-extruded films were produced with several solvent-less and solvent-based adhesives; rigid and flexible. The details of the adhesives used are described in Table 4.

TABLE 4

References of Polyurethane Adhesives for Laminations

| Matrix | Supplier | Mix ratio | Type |
| --- | --- | --- | --- |
| [MOR-FREE ™ 698 A: MOR-FREE ™ C79] | Dow | [100:50] | Rigid solvent-less |
| [MOR-FREE ™ 698 A: PPG 400] | Dow | [100:55] | Flexible solvent-less |
| [ADCOTE ™ 563 EA: Cat F] | Dow | [100:14] | Rigid solvent-based |
| [ADCOTE ™MA 811 EA/ MOR-FREE ™ 200C] | Dow | [100:4.5] | Flexible solvent-based |

In Table 4, the polyurethane adhesives were classified from rigid to flexible by taking into consideration the following characteristics: (1) Average functionality—the higher the average functionality, the more rigid is the adhesive and vice versa; (2) wt. % aromatics/aliphatics—the higher the concentration of aromatics, the more rigid is the adhesive and vice versa; (3) mol. % fractions of ether groups, ester groups and urethane groups—the higher the concentration of ether, the more flexible is the adhesive. On the contrary, the higher the concentration of ester and urethane, the more rigid is the adhesive; (4) Theoretical Hansen solubility parameter—this parameter describes the polarity of the system. The higher the Hansen solubility parameter, the better adhesion is the adhesive on a polar substrate.

Laminates with BOPET/Mono-Extruded Films

TABLE 5

Critical Drop Height Properties

| Formulation | Pouch mean failure height [cm] |
| --- | --- |
| Ex 1 - Rigid SB Adhesive/BOPET | 193 |
| Ex 1 - Rigid SL Adhesive/BOPET | 192 |
| CE A - Rigid SB Adhesive/BOPET | 150 |
| CE A - Rigid SL Adhesive/BOPET | 116 |

Figure 3:
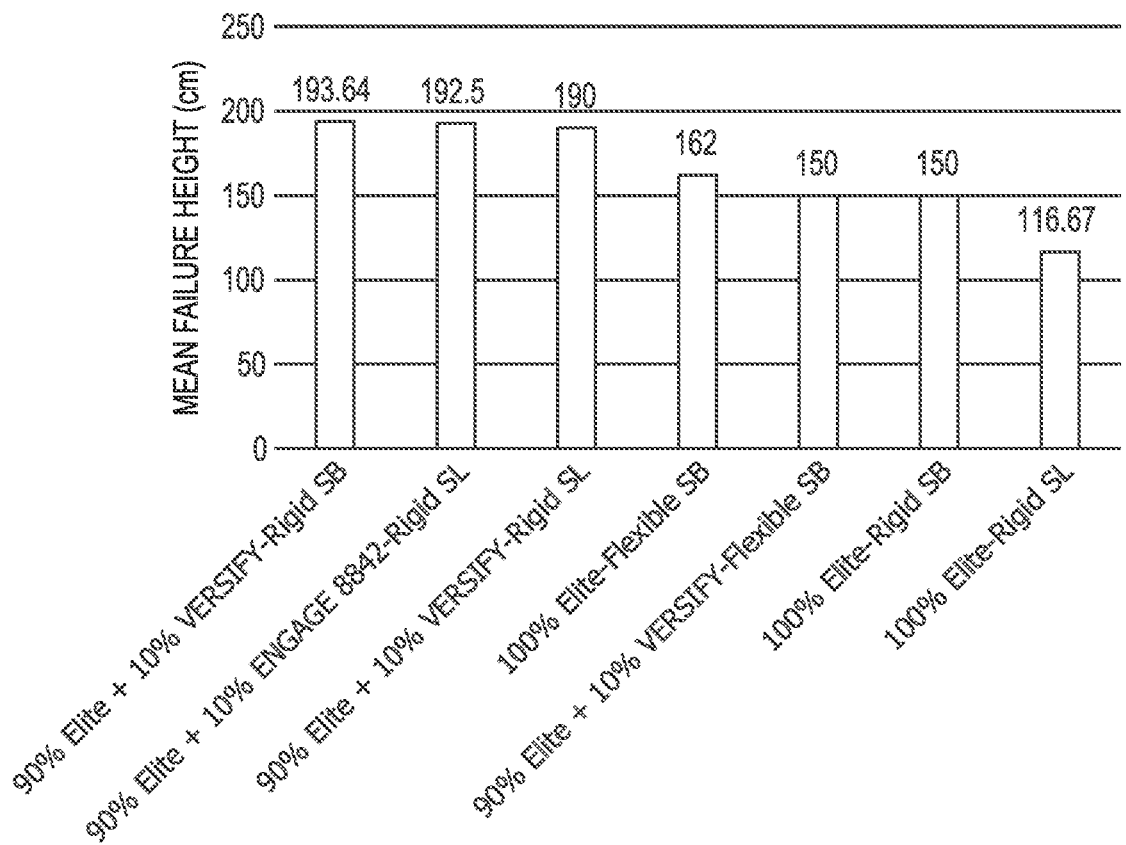
FIG. 3 provides a critical drop height of laminates with solvent-based and solvent-less, rigid and flexible, adhesives of examples and comparative examples of the present disclosure.

FIG. 3 compares the critical drop heights of laminates prepared with the range of adhesives described in Table 4. The laminates were prepared with a 12 μm thick BOPET film and a 100 μm film of the compound formulation of CE A, the compound formulation of CE B or the compound formulation of Ex 1 as seen in Table 5, above. As illustrated in FIG. 3, higher drop performance values are reached when using a laminate containing a TPE, associated with the use of a rigid adhesive (solvent-based or solvent-less).

Seal Performance

Laminates with PET/Co-Extruded Films: Tensile Properties and Drop Height Performances Drop height performance can be linked to seal performance. Test seal performance using the high speed tensile test is discussed above. Results obtained on the seals with the laminates used for the drop height tests are summarized in Table 6 and Table 7.

TABLE 6

Critical Drop Height Properties/Seal Performance

| Formulation | Energy absorption pouch seal (J) |
| --- | --- |
| Ex 1 - Rigid SB Adhesive/BOPET | 0.71 |
| Ex 1 - Rigid SL Adhesive/BOPET | 0.32 |

TABLE 6-continued

Critical Drop Height Properties/Seal Performance

| Formulation | Energy absorption pouch seal (J) |
|---|---|
| CE A - Rigid SB Adhesive/BOPET | 0.26 |
| CE A - Rigid SL Adhesive/BOPET | 0.14 |

TABLE 7

| Formulation | Pouch critical drop height (cm) |
|---|---|
| LLDPE/Ex 1/ LLDPE-RIGID SL-BOPET | 373 |
| LLDPE/CE A/LLDPE-RIGID SL-BOPET | 320 |

The study of seal strength highlights that the highest seal performances were observed when using a film made of the compound formulation of Ex 1 as seen in Tables 6 and 7, above, together with a rigid solvent-based adhesive.

Figure 4:
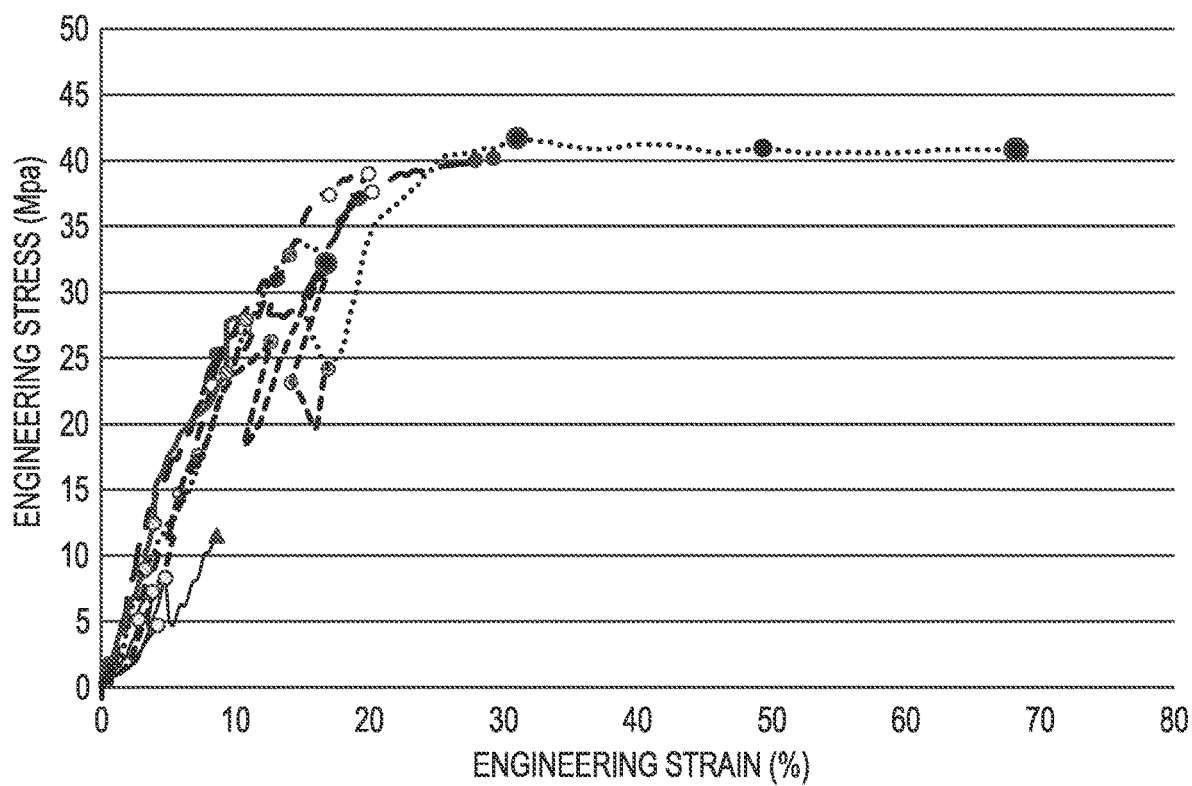
FIG. 4 provides a tensile properties of laminates made of PET/co-extruded films, with several adhesives for examples and comparative examples of the present disclosure.

FIG. 4 summarizes the tensile properties of laminates made of PET/co-extruded films, with several adhesives. Similarly, to the study on laminates made with mono-extruded films, this study highlights that higher performances in terms of stress, strain at break and most importantly failure height are reached when using an association of a laminate containing VERSIFY™ DE2400.05 Elastomer in its co-extruded film (Ex 1), together with a solvent-less adhesive.

As seen above, the addition of thermoplastic polyolefin elastomer and especially VERSIFY™ TPE in thin films (up to 100 μm) allows a significant increase of impact resistance of HDPE films, with a limited decrease of the stiffness. Moreover, the addition of a TPE (e.g., VERSIFY™ TPE) in a mono-layer or co-extruded layer, laminated with a PET layer to form a pouch results in a significant and surprising improvement in the drop performance of a stand-up pouch, especially when the films are laminated with a solvent-less rigid adhesive as seen herein.

An additional example of a multilayer film of the present disclosure includes one having a three layer structure (A/B/C) with a total thickness of 100 micrometer, formed on the Alpine 3-layer Extrusion line with a blow-up-ratio of 2.5 and having a percent thickness of each layer of 25/50/25, where A is ELITE™ 5940ST+10% VERSIFY™ 2300; B is ELITE™ 5940ST+10% VERSIFY™ 2300; and C is AFFINITY™ 1881G sealant. Laminate this multilayer example on a Nordmeccanica pilot line with 12 micron BOPET films using a MOR-FREE™ Adhesive system: L+/CR 121. Convert the laminates into Stand-up pouch (SUP) filled with 370 ml of water. Drop test these pouches on a pouch drop tester following the staircase method to determine the critical pouch drop height of survival (50% of pouches fail/break when dropped from this height). The average pouch survival drop height for the example was 291 millimeters, which shows that with the inventive system of a medium to higher density core layer modified with a small amount of elastomeric material like Versify 2300, the critical drop height of a much stiffer PE film (compared to the 0.920 g/cm³ reference film made of DOWLEX™ 50656G), a very similar critical drop height can be achieved, which is not possible simply by the medium/higher density film alone. In addition, this data shows the need for a suitable sealant layer like AFFINITY™ 1881 or DOWLEX™ 5056G (LLDPE) to ensure appropriate drop test performance of stiffer PE films. The stiffer PE films allow for downgauging of the PE films without compromising the drop test performance of liquid filled SUP.

What is claimed is:

1. A laminate, comprising,
   (i) a substrate film comprising a biaxially oriented polyethylene terephthalate film, a biaxially oriented polypropylene film, or an oriented polyethylene film;
   (ii) a multilayer film comprising;
      a first layer formed from a first polyolefin composition consisting essentially of:
         (a) 80 to 99.9 weight percent (wt. %) of a high density polyethylene (HDPE) resin having a density from 0.935 to 0.966 g/cm³ measured according to ASTM D792 and a melt index ($I_2$) of 0.3 to 8 g/10 minutes measured at 190° C./2.16 kg according to ASTM D-1238, the wt. % based on the total weight of the first polyolefin composition; and
         (b) 0.1 to 20 wt. % of a propylene-ethylene copolymer thermoplastic elastomer (TPE) comprising at least 60 wt. % of units derived from propylene and at least 0.1 wt. % of units derived from ethylene and having a density of 0.850 to 0.900 g/cm³ measured according to ASTM D792 and a melt index, $I_2$, of 0.1 to 15 g/10 minutes measured at 230° C./2.16 kg according to ASTM D-1238, the wt. % based on the total weight of the first polyolefin composition; and
      a sealant layer on the first layer, wherein the sealant layer has a thickness in a range of 5 micrometers (μm) to 15 μm and wherein the multilayer film has a total thickness in a range of 60 μm to 400 μm; and
   (iii) an adhesive layer comprising polyurethane, formed from a solvent-free adhesive or a solvent-based adhesive, in adhering contact with the substrate film and the first layer of the multilayer film, wherein when the adhesive layer is formed from the solvent-free adhesive the adhesive layer has an elastic modulus of greater than 25 MPa, and when the adhesive layer is formed from the solvent-based adhesive the adhesive layer has an elastic modulus of greater than 0.30 MPa, the elastic modulus being measured for the polyurethane in accordance with ASTM D412.

2. The laminate of claim 1, wherein the substrate film is a biaxially oriented polyethylene terephthalate film having a thickness of 8 to 20 μm.

3. The laminate of claim 1, wherein the substrate film is a biaxially oriented polypropylene film having a thickness of 15 to 50 μm.

4. The laminate of claim 1, wherein the substrate film is a biaxially oriented polyethylene film or a monoaxially oriented polyethylene film having a thickness of 15 to 50 μm.

5. The laminate of claim 1, wherein the substrate layer is a biaxially oriented polyethylene terephthalate film.

6. The laminate of claim 1, wherein the substrate layer is a biaxially oriented polypropylene film.

7. The laminate of claim 1, wherein the substrate layer is an oriented polyethylene film.

8. The laminate of claim 1, wherein the adhesive layer has a thickness of 1 to 5 μm.

9. The laminate of claim 1, wherein the adhesive layer is formed from the solvent-free adhesive.

10. The laminate of claim 1, wherein the adhesive layer is formed from the solvent-based adhesive.

11. The laminate of claim 1, wherein the adhesive layer is a two-component polyurethane adhesive system.

12. The laminate of claim 11, wherein the two-component polyurethane adhesive system comprises a polyol and an isocyanate.

13. The laminate of claim 1, wherein the first polyolefin composition of the first layer of the multilayer film includes 5 to 15 wt. % of the propylene-ethylene copolymer TPE.

14. The laminate of claim 1, wherein the propylene-ethylene copolymer TPE has a melt temperature of 50 to 130° C. taken at a DSC Tm peak.

15. The laminate of claim 1, wherein the propylene-ethylene copolymer TPE has a flexural modulus of 20 to 60 mega-Pascals (MPa) measured according to ASTM D790.

16. The laminate of claim 1, wherein the first layer of the multilayer film formed from the first polyolefin composition has a thickness of 30 to 150 micrometers (μm).

17. The laminate of claim 1, wherein the sealant layer comprises from 50 to 100 percent by weight of the sealant layer of a polyethylene having a density from 0.880 to 0.915 g/cm$^3$ and a melt index, $I_2$, of 0.5 to 5 g/10 minutes measured at 190° C./2.16 kg according to ASTM D-1238, and a peak melting point in a range of from 85° C. to 105° C., and a molecular weight distribution, Mw/Mn range of 2.0 to 3.0.

18. A package comprising the laminate according to claim 1.

19. The package of claim 18, wherein the package is a stand-up pouch.

20. The laminate of claim 1, where the multilayer film is a blown film or a cast film.

\* \* \* \* \*